US006449075B1

United States Patent
(12) United States Patent
Watson et al.

(10) Patent No.: US 6,449,075 B1
(45) Date of Patent: Sep. 10, 2002

(54) METHOD AND SYSTEM FOR ENABLING WIRELESS DATA COMMUNICATIONS WITH ELECTRONIC DEVICES HAVING DISPARATE OPERATING SYSTEMS

(75) Inventors: Michael R. Watson; T. Allan Hamilton, both of San Jose, CA (US)

(73) Assignee: Zilog, Inc., Campbell, CA (US)

( * ) Notice: Subject to any disclaimer, the term of this patent is extended or adjusted under 35 U.S.C. 154(b) by 0 days.

(21) Appl. No.: 09/131,824

(22) Filed: Aug. 10, 1998

(51) Int. Cl.[7] ................................................ H04B 10/00

(52) U.S. Cl. .................. 359/172; 359/152; 340/825.72; 709/221

(58) Field of Search ................................ 359/152, 172; 340/825.72; 455/151.2, 418; 717/11; 709/211, 221

(56) References Cited

U.S. PATENT DOCUMENTS

| | | | | | |
|---|---|---|---|---|---|
| 5,343,319 | A | * | 8/1994 | Moore | 359/152 |
| 5,430,877 | A | * | 7/1995 | Naylor | 717/11 |
| 5,593,349 | A | * | 1/1997 | Miguel et al. | 463/30 |
| 5,793,957 | A | * | 8/1998 | Kikinis et al. | 709/211 |
| 5,864,708 | A | * | 1/1999 | Croft et al. | 359/152 |
| 5,982,520 | A | * | 11/1999 | Weiser et al. | 359/172 |
| 6,014,725 | A | * | 1/2000 | Kind et al. | 711/103 |

* cited by examiner

*Primary Examiner*—Kinfe-Michael Negash
(74) *Attorney, Agent, or Firm*—Steins & Associates

(57) ABSTRACT

A Method and System for Enabling Wireless Data Communications with Electronic Devices having Disparate Operating Systems is disclosed. Also disclosed is a system that compares the Infrared or RF communications configuration of an electronic appliance to a target profile, and then uploads the target configuration profile to the appliance, if necessary. The preferred device and system perform a functional testing on the wireless communications system of the electronic appliance, including the transceiver hardware and all device drivers and software stacks. Furthermore, the device of the present invention is able to adopt the target configuration from an electronic appliance by downloading it from one or more appliances. Still further, the device of the present invention is able to communicate with two or more electronic appliances simultaneously. The device and system of the present invention are operable independent of the BIOS of the electronic appliance(s) to be configured. Finally, the method of the present invention includes steps for comparing the wireless communications configuration of an electronic appliance to a target configuration and then uploading the target system and testing the electronic appliance for operability with the new configuration.

20 Claims, 5 Drawing Sheets

METHOD AND SYSTEM FOR ENABLING WIRELESS DATA COMMUNICATIONS WITH ELECTRONIC DEVICES HAVING DISPARATE OPERATING SYSTEMS

BACKGROUND OF THE INVENTION

1. Field of the Invention

This invention relates generally to infrared and radio frequency communications systems and, more specifically, to a Method and System for Enabling Wireless Data Communications with Electronic Devices having Disparate Operating Systems.

2. Description of Related Art

As technology becomes continually more accessible to the "common man," the ability to use, store, transfer and otherwise manipulate information has become the focus of most businesses as well as for the individual consumer. Access to the information resources is commonly by some sort of network system, including World Wide Web, "Intranets", local area networks, wide area networks, as well as corporate databases.

While the conventional method for connecting to one of these information networks has been via cable and wire, as the reliance upon connectivity to information has deepened, the desire to gain such access from mobile or portable devices has strengthened. These portable devices, such as Personal Digital Assistants, handheld computers, cellular telephones, and even digital cameras are now being connected to each other and to networks via Infrared Data Communications. In fact, it is virtually impossible to purchase a notebook computer today that does not include an Infrared or Radio Frequency (RF) Data Communications assembly resident within it.

With this proliferation of Ir and RF communications capability, a number of compatibility problems have arisen. From this point forward, we will focus upon Ir data communications systems; this is under the understanding that the identical issues and solutions pertain to RF data communications.

Ir communications equipment and software has been evolving so rapidly that it is common that two filly Ir-capable appliances cannot communicate with one another. Alternatively, many times even when two appliances having disparate Ir communications are actually able to communicate with one another, the differences between the systems are so severe as to seriously degrade the quality, analog error rate, and reliability (and therefore speed) of the data transfer. What is needed is a "configurator" system and method for: (1) detecting and testing the configuration of a particular electronic appliance (e.g. a desktop personal computer); (2) comparing that configuration to a standard, such as the configuration of another electronic appliance (e.g. a digital camera); and (3) uploading a configuration to either the desktop personal computer or the digital camera (or both), such that the two devices are mutually Ir-compatible.

SUMMARY OF THE INVENTION

In light of the aforementioned problems associated with the prior devices and methods, it is an object of the present invention to provide a Method and System for Enabling Wireless Data Communications with Electronic Devices having Disparate Operating Systems. The preferred system should compare the Infrared or RF communications configuration of an electronic appliance to a target profile, and then upload the target configuration profile to the appliance, if necessary. It is an object that the device and system perform a functional testing on the wireless communications system of the electronic appliance, including the transceiver hardware and all device drivers and software stacks. It is a further object that the device of the present invention be able to adopt the target configuration from an electronic appliance by downloading it from one or more appliances. It is yet another object that the device of the present invention be able to communicate with two or more electronic appliances simultaneously. It is still another object that the device and system of the present invention be operable independent of the BIOS of the electronic appliance(s) to be configured. It is a further object that there be a method for comparing the wireless communications configuration of an electronic appliance to a target configuration and then uploading the target system and testing the electronic appliance for operability with the new configuration.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and System for Enabling Wireless Data Communications with Electronic Devices having Disparate Operating Systems.

Figure 1:
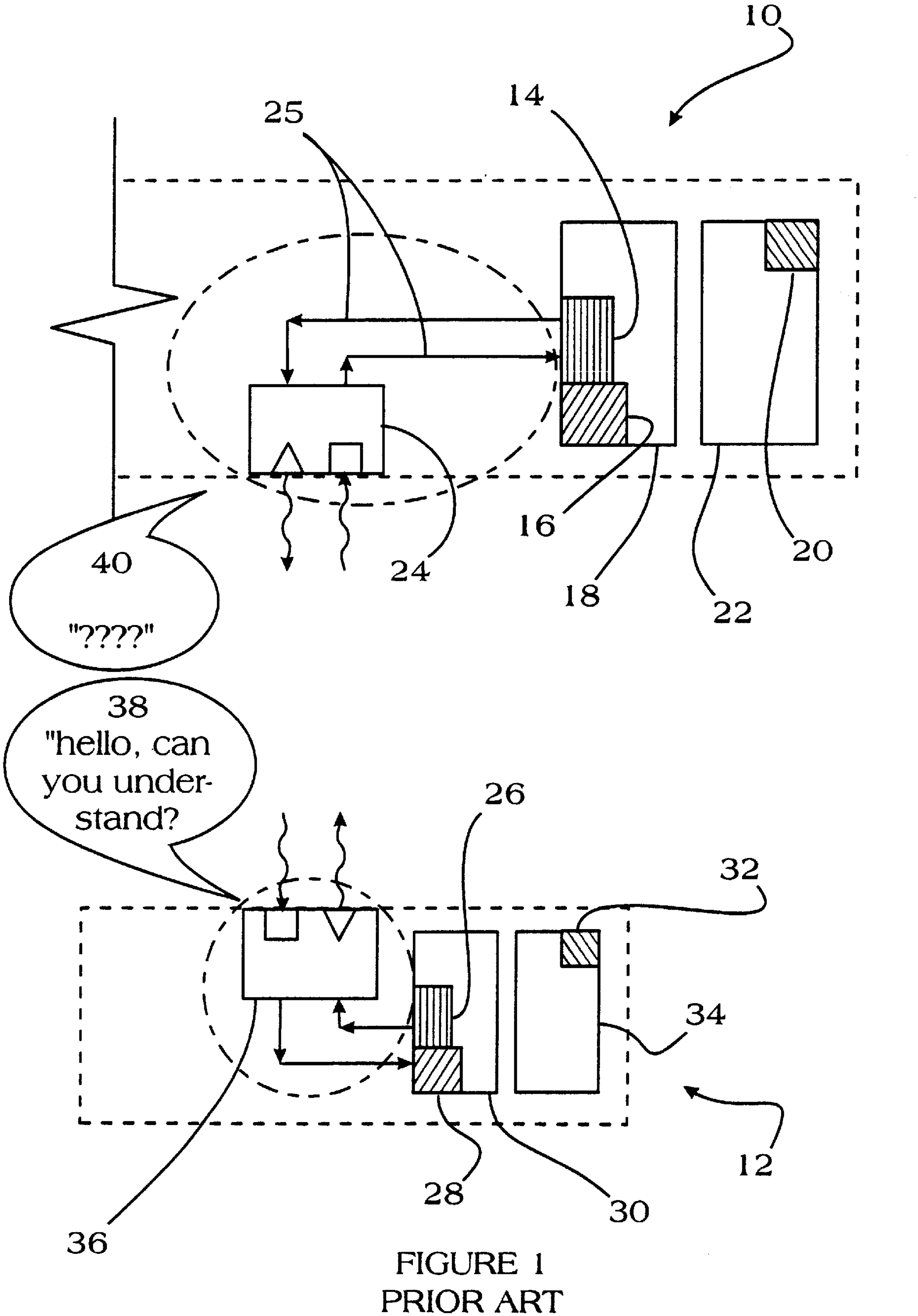
FIG. 1 depicts the major component parts of an Infrared Communications system in conventional Ir-enabled stationary and portable appliances.

The present invention can best be understood by initial consideration of FIG. 1. FIG. 1 depicts the major component parts of an Infrared Communications system between conventional Ir-enabled stationary and portable appliances 10 and 12, respectively. This figure includes a stationary electronic appliance 10, such as a desktop personal computer, for the purposes of discussion, however, it should be appreciated that the stationary appliance 10 is interchangeable with a portable electronic appliance having Ir communications capability of the type discussed above.

In its usual form, the components pertinent to the configuration of the Ir communications system of the stationary appliance 10 are the data communications protocol stack 14 (hereinafter "IrCP"), which, along with the operating system 16 of the appliance 10 are maintained within the available resident memory 18 (e.g. Random Access Memory) when the appliance 10 is in an operating condition. The IrCP 14 is a set of rules and protocols in software form for determining the communications format or type that the appliance 10 will use (in this case for Ir communications). The device of the present invention will remedy this situation, as is discussed in detail below in connection with FIGS. 2–5.

Another component of the Ir communications system of this appliance 10 is the driver library 20 (hereinafter "IrD"), which is a library of "drivers" which determine how the incoming and outgoing Ir-based messages are interpreted by the central processing unit of the appliance 10. The driver library 20 ("IrD") is typically maintained within the permanent storage memory 22 (e.g. a hard drive). This example presumes that the IrCP 14 and IrD 20 are previously resident within the appliance 10; in some cases, there is Ir-capable hardware without the corresponding software (i.e. the IRCP 14 and IrD 20) to operate it.

Finally, the data is actually sent from and received to the appliance 10 via the Ir transceiver system 24. The hardware and/or software comprising the Ir transceiver system 24 determines the physical capability of the Ir communications for the appliance 10. Consequently, the maximum speed and transmission range of the Ir data transferred by the appliance 10 is determined by the transceiver system 24. It should be apparent that the connection 25 between the Ir transceiver system 24 and the IrCP 14 and/or the IrD 20 will not exist if either the IrCP 14 and/or IrD 20 are missing.

Similarly, a conventional portable electronic appliance 12, such as a digital camera, includes an IrCP 26 and Operating System 28 maintained within the resident memory 30. Also, there is a driver library 32 maintained in the permanent storage memory 34, and an Ir transceiver system 36 for communicating with other Ir-capable appliances.

As demonstrated in this FIG. 1, in many circumstances, a user approaches the stationary appliance 10 (e.g. desktop personal computer) with his or her digital camera (portable appliance 12). The user's intent is to download the snapshots captured within the camera 12 onto the desktop PC 10 for manipulation, printing and/or storage. The camera 12 first queries the desktop PC 10, as in balloon 38—alerting the desktop PC 10 and attempting to establish communications. Unless the two IrCP's 14 and 26, the two IrD's 20 and 32, and the two Ir transceivers 24 and 36 have compatible interfaces, the desktop PC 10, while aware that it is being "pinged", will not be able to "understand" the sent data (depicted by balloon 40).

Figure 2A:
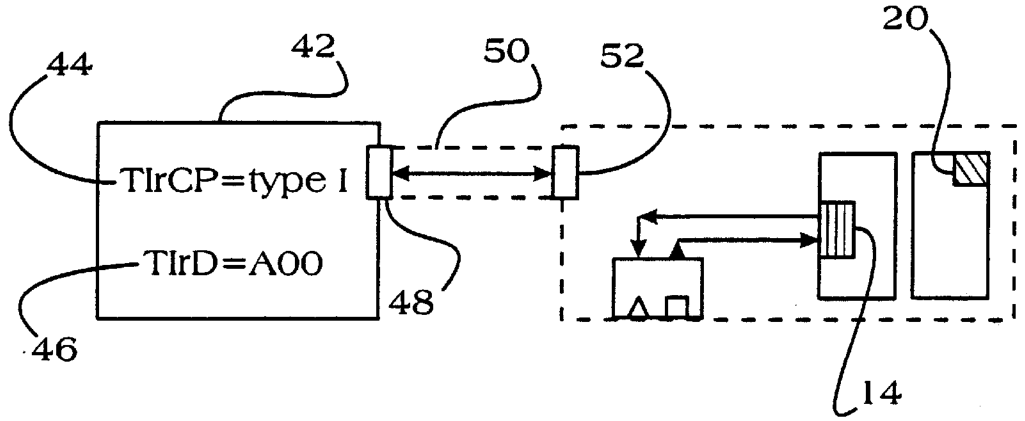
FIGS. 2A, 2B and 2C depict the operation of a preferred embodiment of the Infrared Configuration Means of the present invention.
Figure 2B:
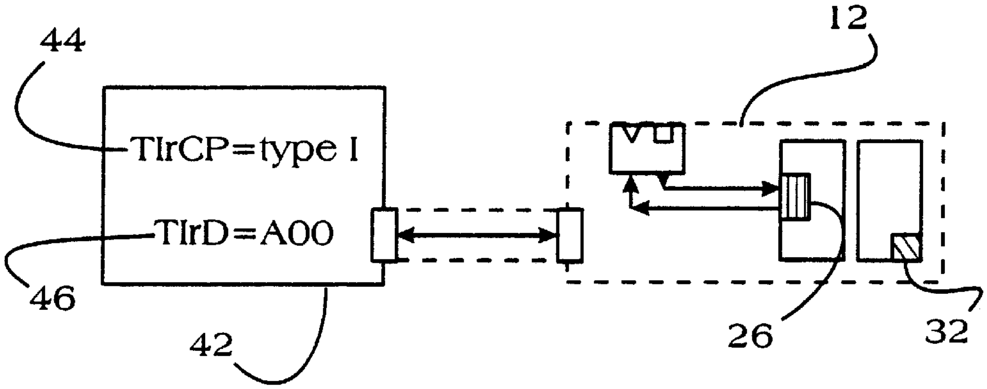
Figure 2C:
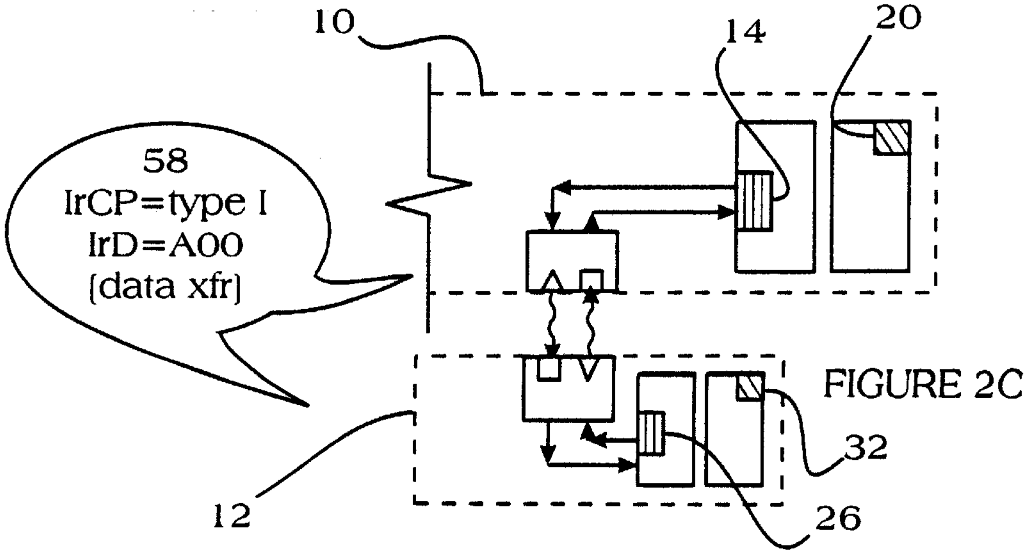

Now tuning to FIGS. 2A–2C, we will begin discussion of the advancement of the present invention. FIGS. 2A, 2B and 2C depict the operation of a preferred embodiment of the Infrared Configuration Means 42 of the present invention The IrCM 42 has target values (and associated data) for the preferred IrCP and IrD, known as the TIrCP 44 and TIrD 46 ("target IrCP" and "target IrD", respectively)—these settings and data might be assigned because they are the latest releases, or because they provide certain benefits for the particular situation over other protocols, among other reasons. Furthermore, the IrCM 42 includes an IrCM ("Ir configuration means") interface 48, which can be either a wireless or wire-type port for communication to the stationary appliance 10 via communication means 50 (i.e. the wire or wireless connection).

At the stationary appliance 10, the communication means 50 cooperates with the SA ("stationary appliance") interface 52 (again, a wired or wireless port). Upon connection, the IrCM 42 will install the TIrCP 44 and the TIrD 46 into the stationary appliance 10 (if necessary), so that the IrCP 14 and IrD 20 now have compatible interfaces with the TIrCP44 and TIrD 46.

Next, as shown by FIG. 2B, the IrCM 42 is connected to the portable appliance 12 via communication means 54 and a portable appliance interface 56 (similar to elements 50 and 52, above), after which the TIrCP 44 and TIrD 46 are installed onto the portable appliance 12.

As depicted by FIG. 2C, now the stationary appliance 10 and the portable appliance 12 have compatible IrCP's and IrD's, such that the conversation simulated by balloon 58 can proceed, including the transfer of data.

Figure 3:
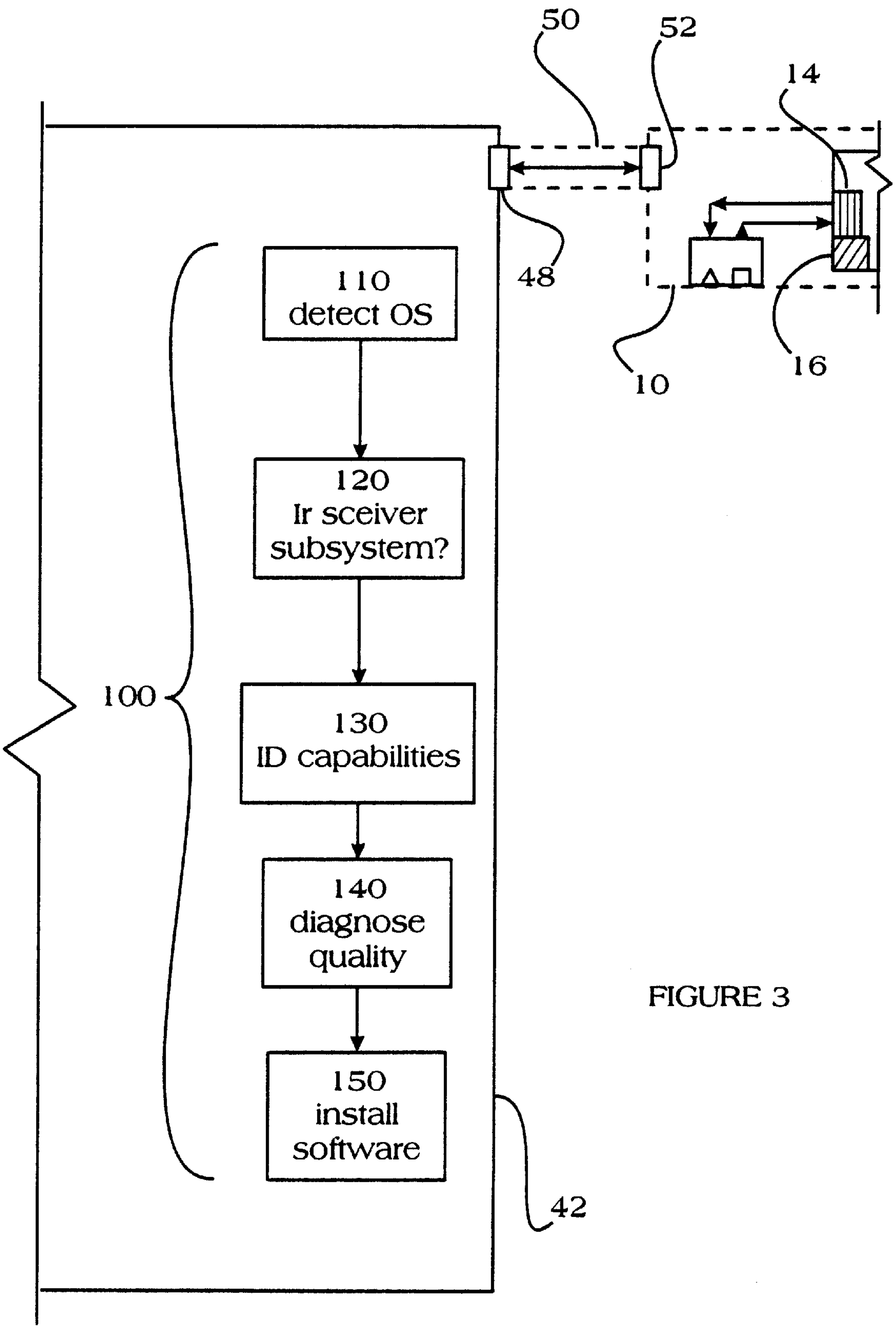
FIG. 3 is a flowchart depicting a preferred method for enabling infrared communications between electronic devices having disparate operating systems and/or Ir communication configurations.

To further understand the novel features of the present invention, we will now discuss FIG. 3. FIG. 3 is a flowchart depicting a preferred method 100 for enabling infrared communications between electronic devices having disparate operating systems and/or Ir communication configurations. In this case, the IrCM 42 executes the steps of the flowchart 100, by communicating with an Ir-capable device, such as the stationary appliance 10 of FIGS. 1 and 2. Upon establishment of communications via the interfaces 48 and 52 and communications means 50, the IrCM 42 will begin seeking the (Ir) configuration and capabilities of the stationary appliance 10. The configuration means 42 first executes step 110 and detects (and identifies) the operating system; once this is done, step 120 of querying the operating system for the existence of an Ir transceiver subsystem is completed. For the purposes of the discussion connected to this FIG. 3, the "Ir transceiver subsystem" includes the IrD, the IrCP, and the Ir transceiver system itself (see FIGS. 1 and 2). If an Ir transceiver subsystem is found, step 130 of identifying the Ir transceiver subsystem's capabilities is performed, after which step 140 of diagnosing the hardware and software quality of the Ir transceiver is executed. Assuming that the condition of the Ir transceiver subsystem is in need of revision in order to match the target settings (see FIG. 2), step 150 is performed, which entails the installation of software to replace missing or faulty or obsolete software detected within the stationary appliance 10. Once the process 100 is complete (and tested satisfactorily as such), the stationary appliance 10 will be able to communicate under the target configuration.

It should be appreciated that the IrCM 42 (and those embodiments later described herein) does not necessarily have to be a stand-alone device. The configuration means 42 could be in the form of software stored on portable digital storage media (e.g. a floppy disk, CD-ROM or "zip" disk), which is inserted into a disk drive within the stationary appliance 10 itself. Alternatively, the IrCM 42 might be hardware and software actually incorporated within the electronic appliance itself In this form, the host appliance (i.e. host for the IrCM 42) would be able to configure and then communicate with any desired Ir-capable appliance. What is unique is the method of detecting and configuring the IrCP 14 and IrD 20 and even the Ir transceiver 24 so that communications are enabled.

Figure 4A:
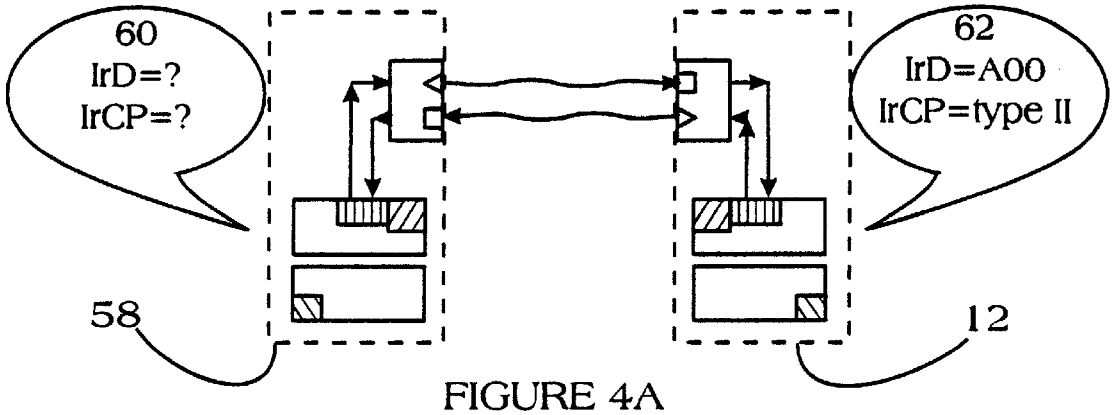
FIGS. 4A, 4B and 4C depict the operation of another preferred embodiment of the Infrared Configuration Means in which the Ir Configuration Means comprises a self-contained device that obtains the target configuration from an Ir-capable appliance.
Figure 4B:
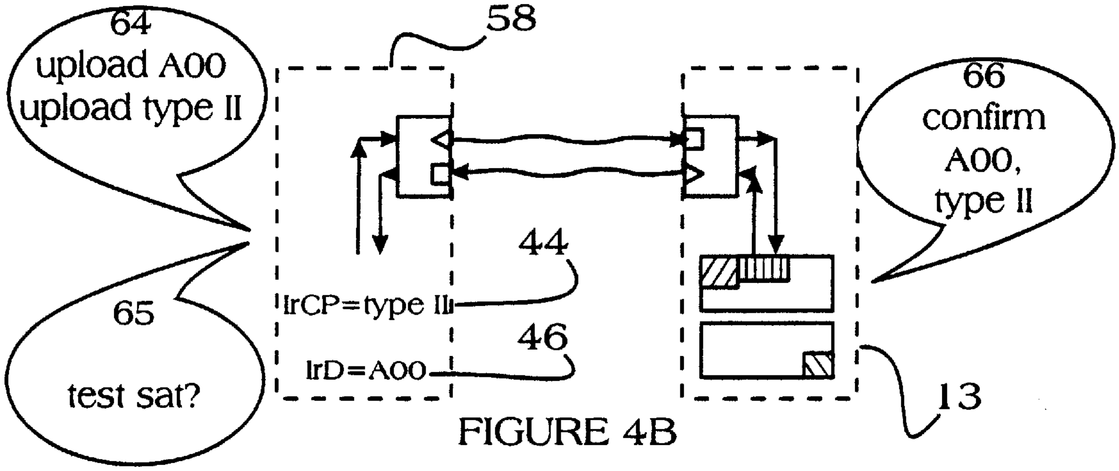
Figure 4C:
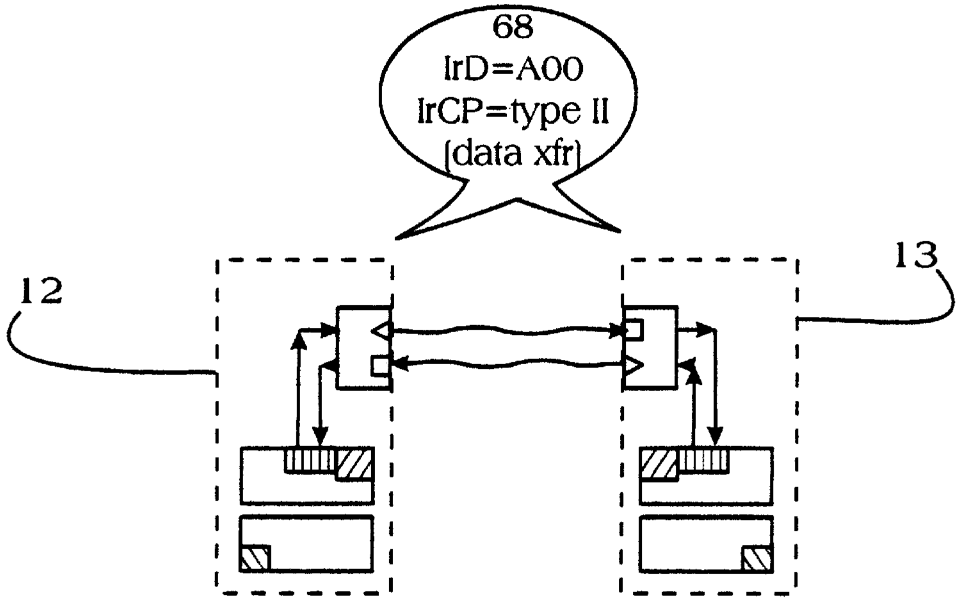

FIGS. 4A–4C depict the operation of another preferred embodiment of the Infrared Configuration Means 58 in which the Ir Configuration Means 58 comprises a self-contained device that obtains the target configuration from an Ir-capable appliance. As shown in FIG. 4A, the alternative IrCM 58 communicates with the portable appliance 12 via infrared data transfer. The IrCM 58 is capable of communications with virtually any appliance 12, no matter the installed Ir setup, because it essentially contains virtually every protocol and driver released for integration into commercially-sold devices. Upon connection, the IrCM 58 presents the query of balloon 60, i.e. requesting the IrD and IrCP data, which is transmitted by the portable appliance 12 as depicted in balloon 62. Once received, the IrCM 58 stores the data as the target configuration.

As shown in FIG. 4B, the IrCM 58 is now configured with the TIrCP 44 and TIrD 46 (just downloaded from the first portable appliance 12). Once connected to a second portable appliance 13 (e.g. a cellular telephone), the TIrCP 44 and TIrD 46 are uploaded from the IrCM 58 to the cellular telephone 13 (see balloon 64). Upon receiving the upload, the IrCM 58 queries whether the upload is functional (see balloon 65), whereupon the second portable appliance 13 responds in the affirmative, if appropriate (see balloon 66).

As shown in FIG. 4C, once uploaded, the first and second portable appliances 12 and 13 can carry on the "discussion" represented by balloon 68, since both will be using the same Ir communications protocol.

It is also pointed out that the IrCM 58 may have the ability to compare the configurations of the two portable appliances 12 and 13; had it determined that the first portable appliance 12 included software that was obsolete as compared to that stored in the second portable appliance 13, it might assign the second appliance's 13 configuration as the target, thereafter prompting the user to re-establish communications with the first appliance 12 to upgrade its configuration to match the second appliance's 13 later version(s).

Figure 5A:
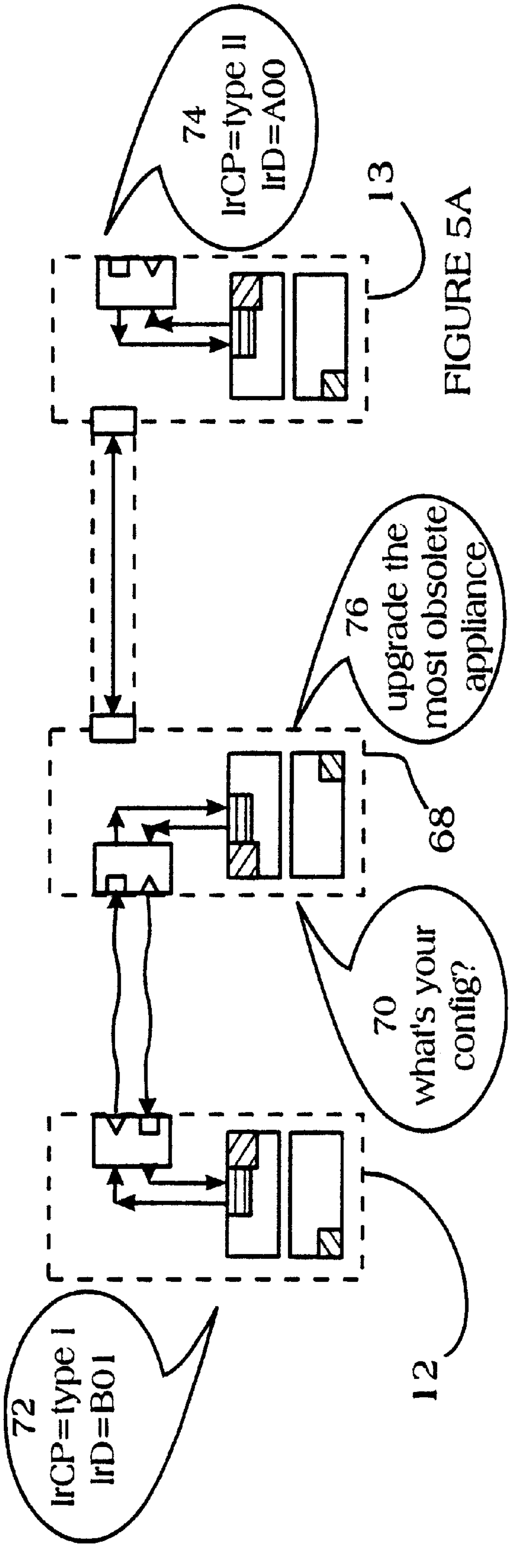
FIGS. 5A and 5B depict the operation of another preferred embodiment of the Ir Configuration Means in which the Ir Configuration Means comprises a standalone device capable of simultaneous communication with at least two Ir-enabled electronic appliances.
Figure 5B:
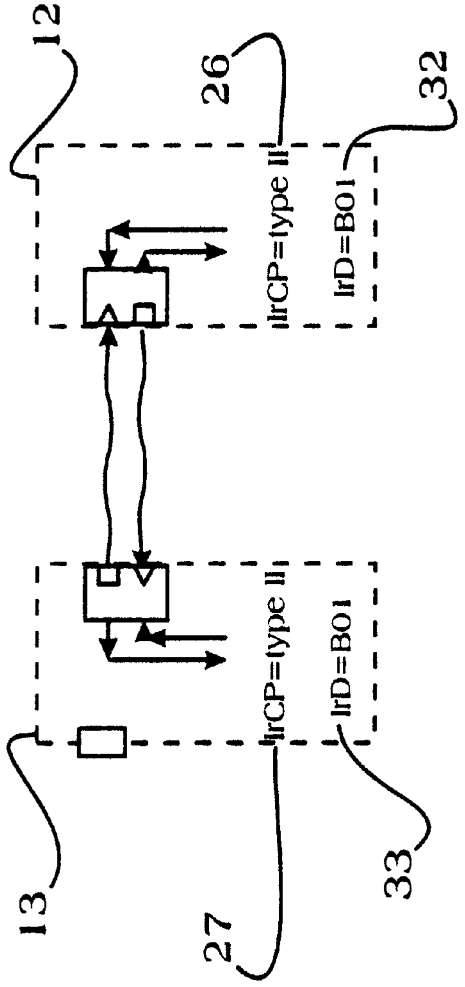

FIGS. 5A and 5B depict yet another novel embodiment of the Ir Configuration Means 68 of the present invention, in which the Ir Configuration Means 68 comprises a standalone device capable of simultaneous communication with at least two Ir-enabled electronic appliances 12 and 13. In this case, the IrCM 68 is in communication with the first portable appliance 12 via infrared means. Simultaneously, the IrCM 68 is connected to the second portable appliance 13 via another means for communication (as discussed previously in connection with FIGS. 2A–2C). Once connected to both appliances 12 and 13, the IrCM 68 presents the query represented by balloon 70, requesting the Ir configurations and capabilities of both appliances 12 and 13. The appliances 12 and 13 respond as depicted by balloons 72 and 74, respectively. If we assume that "Type II" is the most recent IrCP (as compared to "Type I"), and that "B01" is the most recent IrD (as compared to "A00"), we will notice that the first portable appliance 12 contains the preferred IrD configuration (i.e. "B01"), but the second appliance 13 contains the preferred IrCP configuration (i.e. "Type II").

In this situation, the IrCM 68 will detect the status and act as shown in balloon 76; thereby upgrading both appliances 12 and 13 to the preferred IrD and IrDP configurations. The resultant status is depicted by the balloon 78 of FIG. 5B.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for enabling infrared communications between electronic appliances having disparate infrared communications configurations, comprising:

infrared communications means for conducting communications via infrared signal in each said electronic appliance; and infrared configuration means for:

detecting said infrared communication configuration in one said appliance via said infrared communications means;

comparing at least one said infrared communication configuration to a target configuration; and uploading said target configuration to a said electronic appliance via infrared signals sent between said appliances by said infrared communication means, if desired.

2. The system of claim 1, wherein said infrared configuration means further comprises means for testing said uploaded configuration.

3. The system of claim 2, wherein said electronic appliances further comprise infrared transceiver hardware, and said infrared configuration means further comprises means for testing the functionality of said infrared transceiver hardware.

4. The system of claim 3, wherein said infrared configuration means further comprises means for communicating with said electronic appliances, said communicating means including wireless and/or wired systems.

5. The system of claim 4, wherein said communicating means further comprises a capability to communicate simultaneously with at least two said electronic appliances.

6. The system of claim 4, wherein each said electronic appliance further comprises a Basic Input Output System for managing data transfer in to and out from said electronic appliance, and said infrared configuration means is functional independent of the type of said Basic Input Output System.

7. A method for enabling wireless communication between electronic appliances having disparate wireless communication configurations, comprising the steps of:

wireless detection by one said electronic appliance of said communications configuration of another said electronic appliance;

comparing said detected wireless communication configuration to a target configuration; and wirelessly uploading said target configuration to said other electronic appliance, if desired.

8. The method of claim 7, wherein each said electronic appliance further comprises an operating system and at least one infrared transceiver system, wherein said comparing further comprises detecting said operating system.

9. The method of claim 8, wherein said comparing further comprises detecting the existence of said infrared transceiver system.

10. The method of claim 9, wherein said comparing further comprises identifying the capabilities of said infrared transceiver system.

11. The method of claim 10, wherein said comparing further comprises testing said infrared transceiver system.

12. The method of claim 11, wherein said infrared communication configuration comprises software components, and said uploading further comprises installing missing, faulty or obsolete said software components on said electronic appliance.

13. The method of claim 8, wherein said target configuration may be defined by a first comparing, said first comparing comprising:

individually querying each of at least two said electronic appliances for their said wireless communication configuration, each said configuration comprising components;

second comparing said components of one said individual communication configuration to said components of another said individual communication configuration; and creating said target configuration by selecting the preferred components resulting from said second comparing.

14. A system for enabling wireless communications between electronic appliances having disparate wireless communications configurations, comprising:

wireless configuration means for:

detecting said wireless communication configuration in another said electronic appliance, said detecting via wireless signaling between said electronic appliances;

comparing at least one said wireless communication configuration to a target configuration; and wirelessly uploading said target configuration to a said electronic appliance, if desired.

15. The system of claim 14, wherein said wireless configuration means further comprises means for testing said uploaded configuration.

16. The system of claim 15, wherein said electronic appliances further comprise wireless transceiver hardware, and said wireless configuration means further comprises means for testing the functionality of said wireless transceiver hardware.

17. The system of claim 16, wherein said wireless configuration means further comprises means for communicating with said electronic appliances, said communicating means including wireless and/or wired systems.

18. The system of claim 17, wherein said communicating means further comprises a capability to communicate simultaneously with at least two said electronic appliances.

19. The system of claim 18, wherein each said electronic appliance further comprises a Basic Input Output System for managing data transfer in to and out from said electronic appliance, and said wireless configuration means is functional independent of the type of said Basic Input Output System.

20. The method of claim 7, wherein:

said comparing step comprises comparing at least one infrared communication configuration to a target configuration; and said uploading step comprises uploading said target configuration to a said electronic appliance by infrared.

* * * * *